Sept. 10, 1940.    M. P. HEINZE    2,214,054
COMB ASSEMBLY
Filed Nov. 7, 1938    15 Sheets-Sheet 1
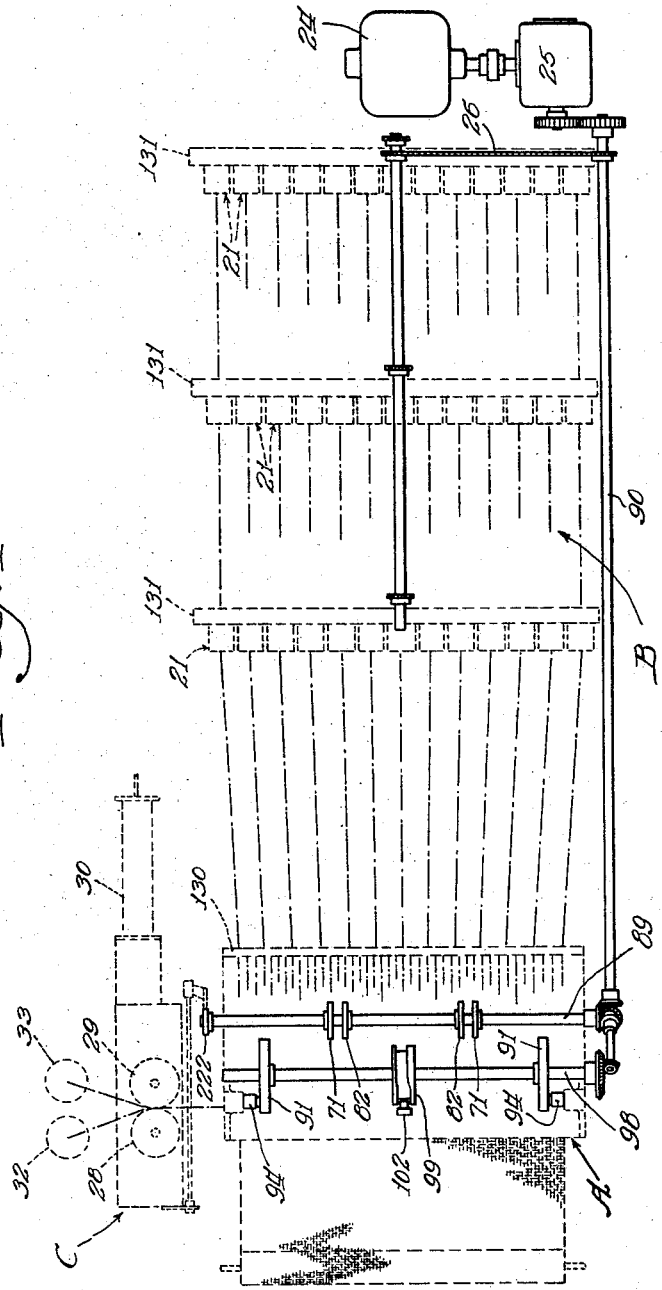
Inventor:
Max P. Heinze
By: Edward C. Gritzbaugh
Atty.

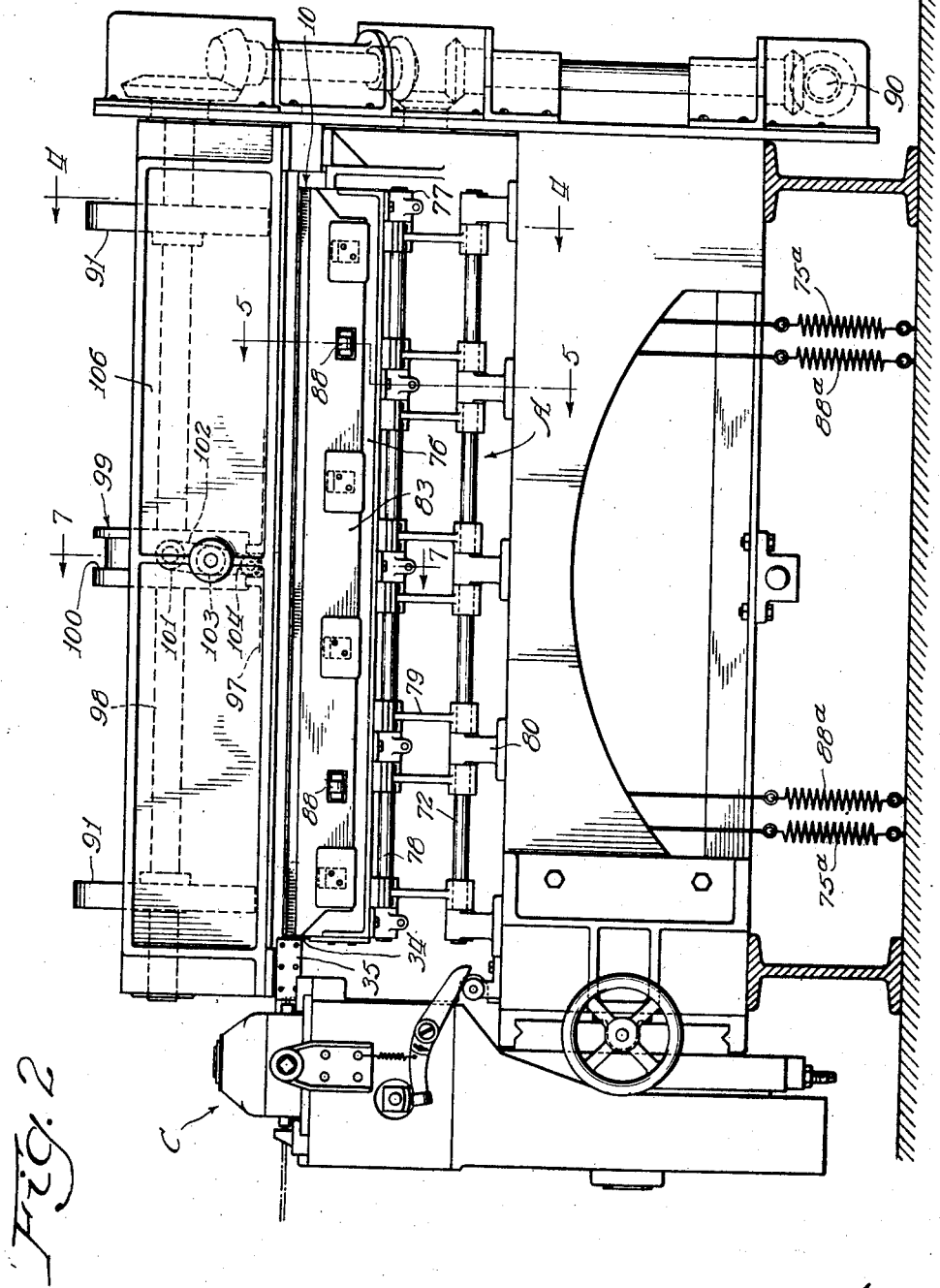

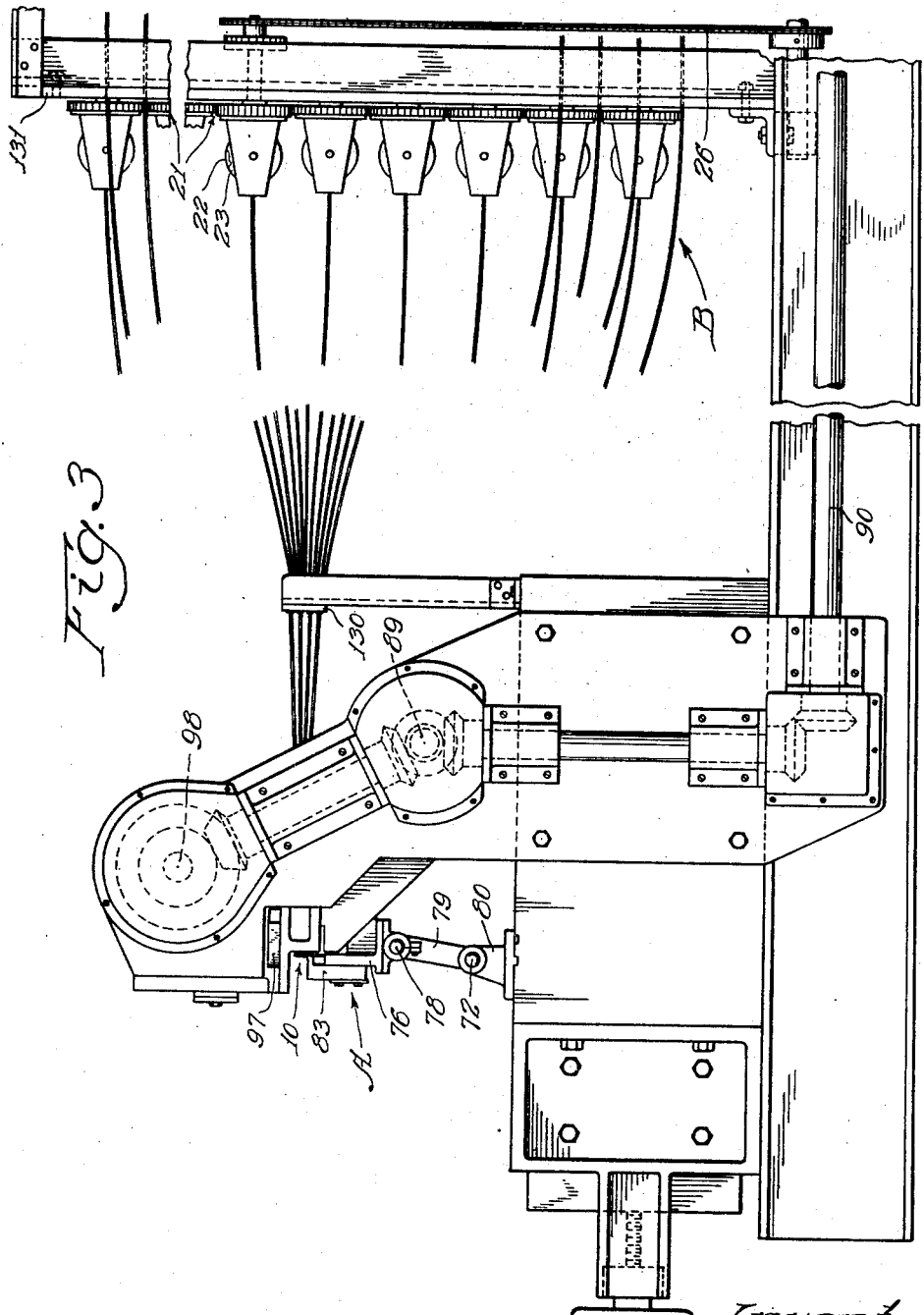

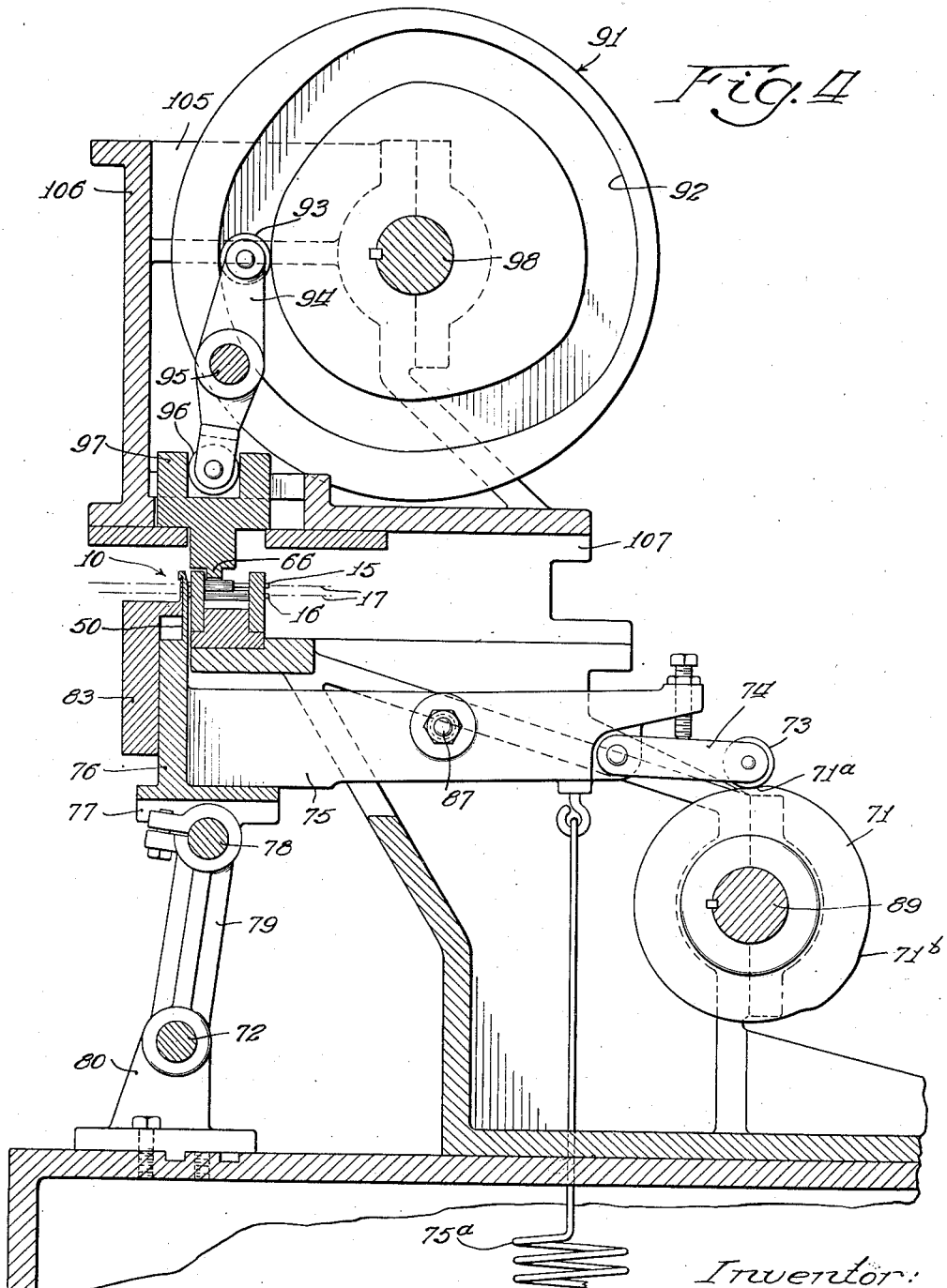

Sept. 10, 1940.  M. P. HEINZE  2,214,054
COMB ASSEMBLY
Filed Nov. 7, 1938  15 Sheets-Sheet 5
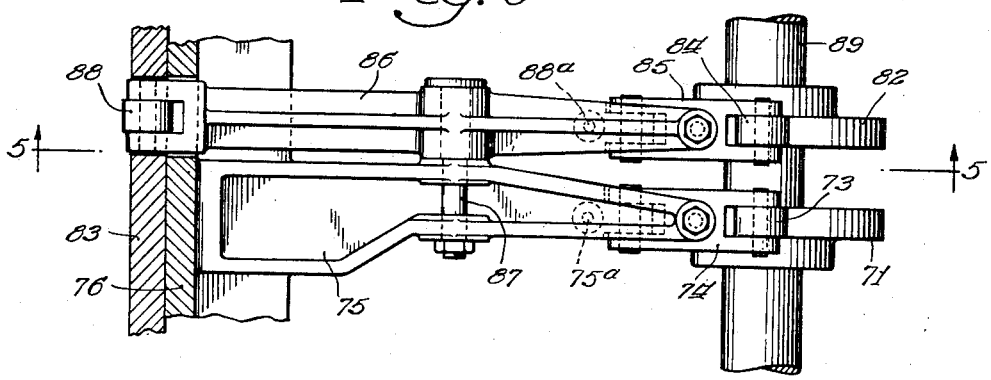
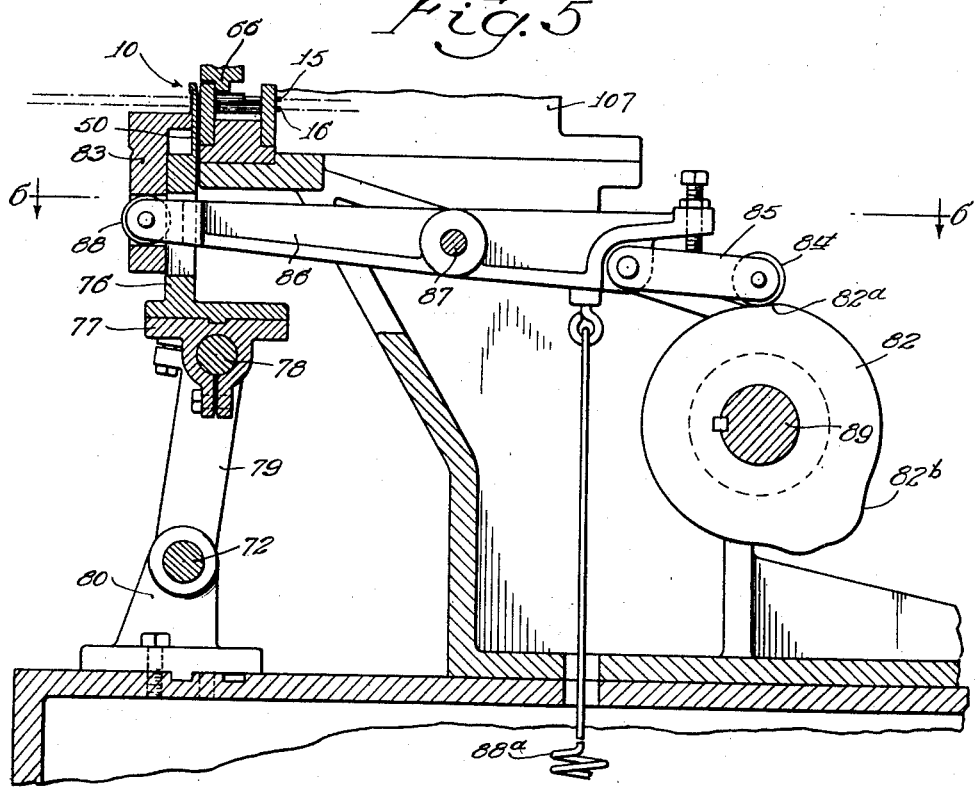
Inventor:
Max P. Heinze
By: Edward C. Gritzbaugh
Atty.

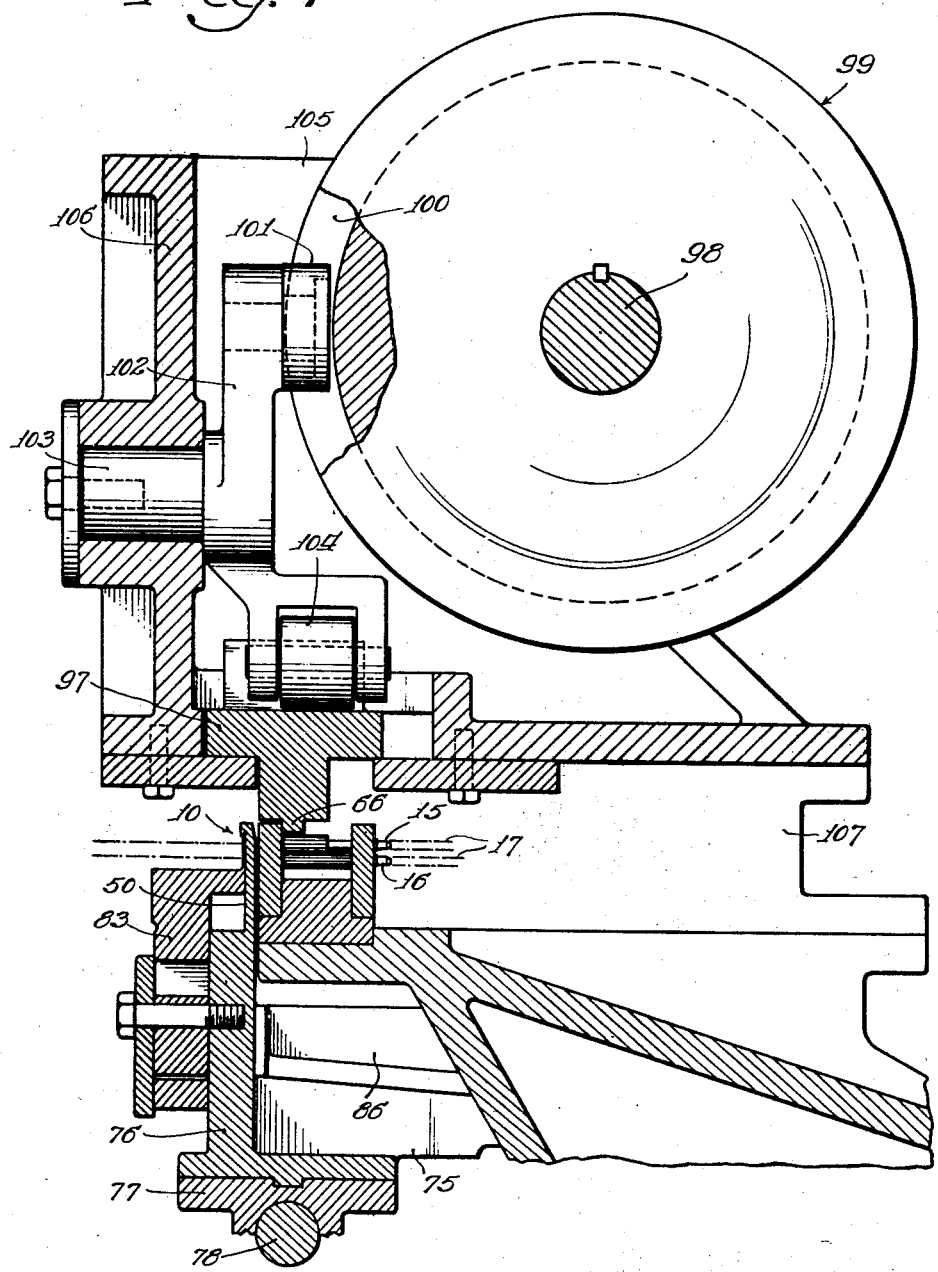

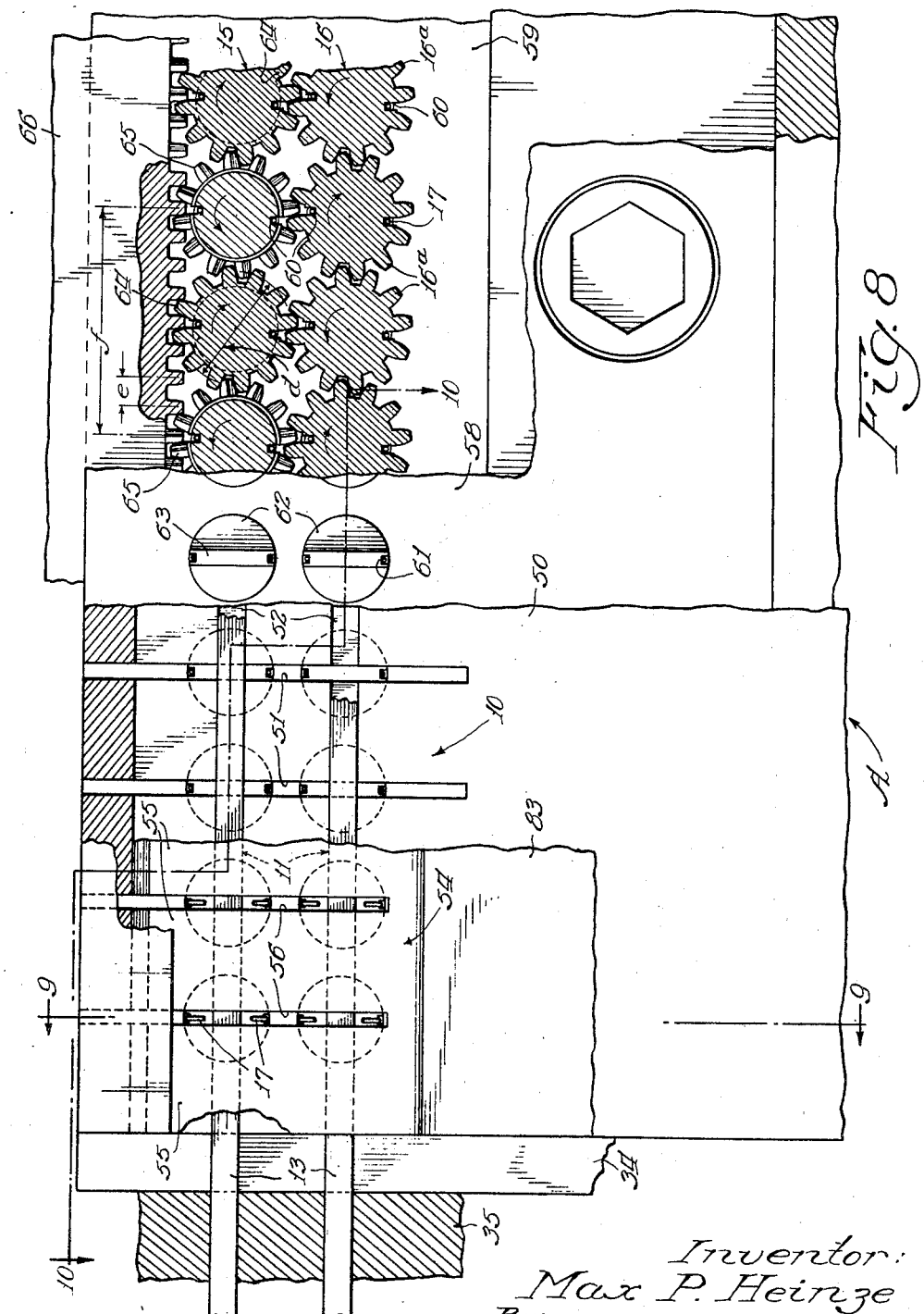

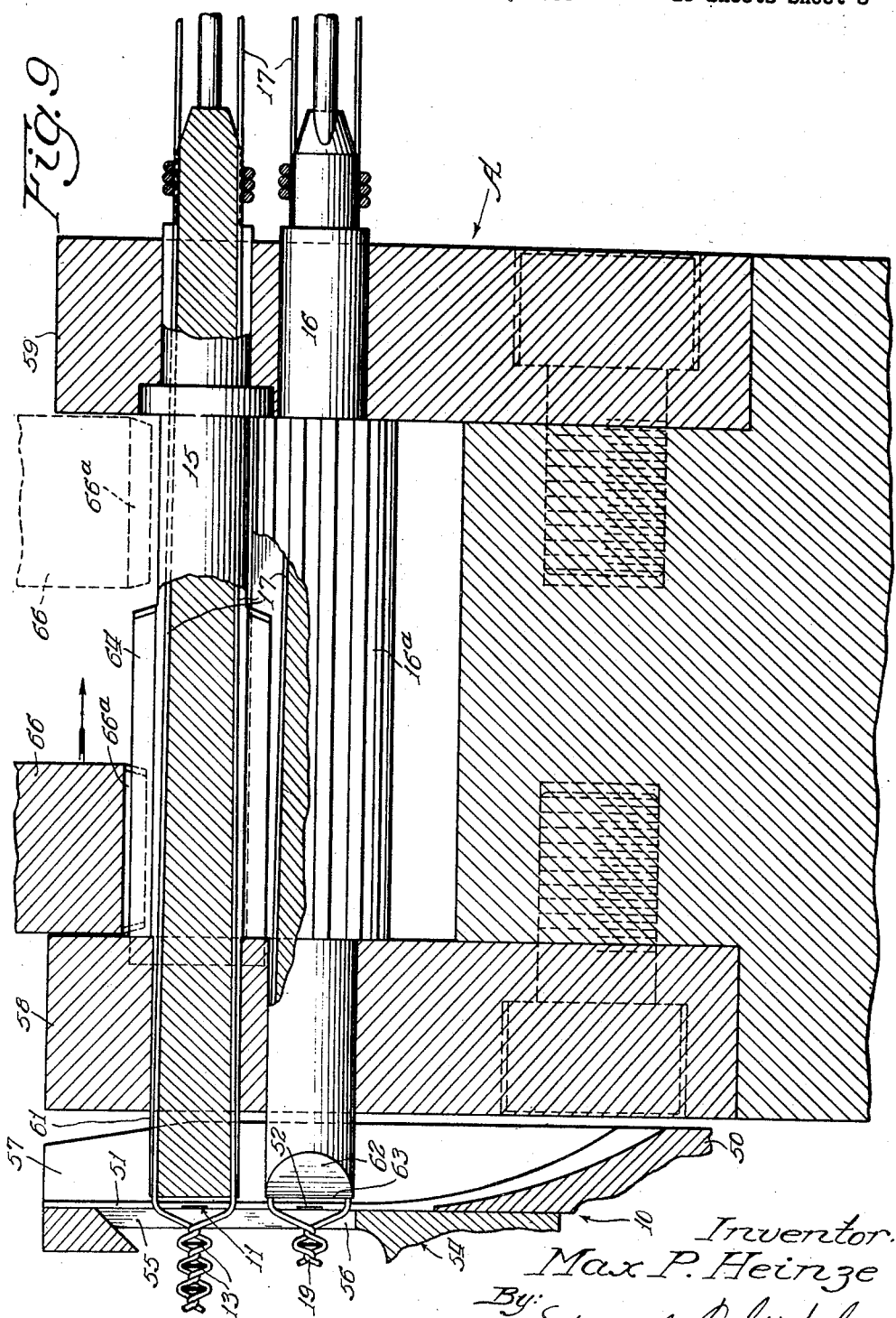

Sept. 10, 1940. M. P. HEINZE 2,214,054
COMB ASSEMBLY
Filed Nov. 7, 1938 15 Sheets-Sheet 9
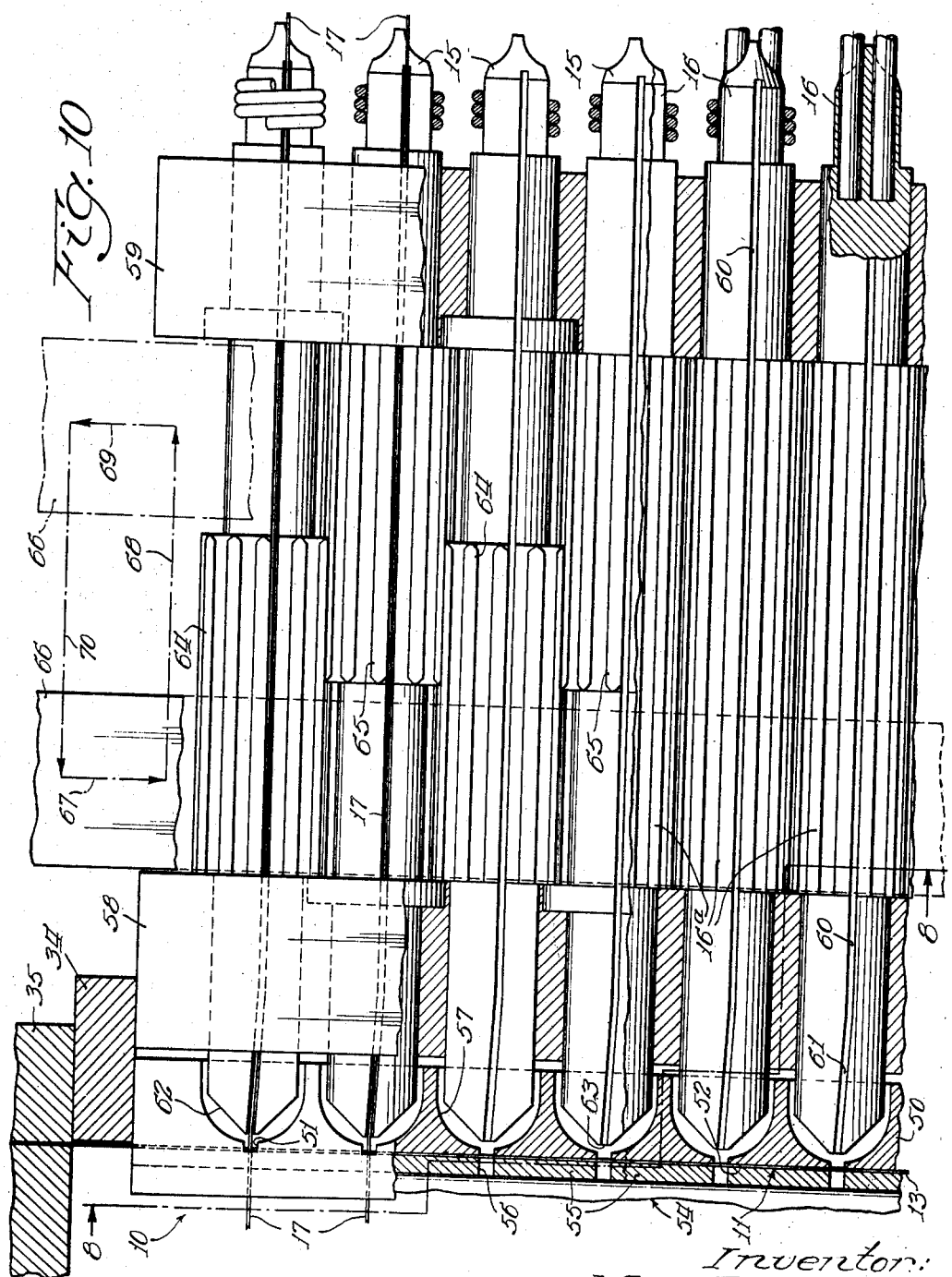
Inventor:
Max P. Heinze
By: Edward C. Gritzbaugh
Atty.

Sept. 10, 1940.   M. P. HEINZE   2,214,054
COMB ASSEMBLY
Filed Nov. 7, 1938   15 Sheets-Sheet 10
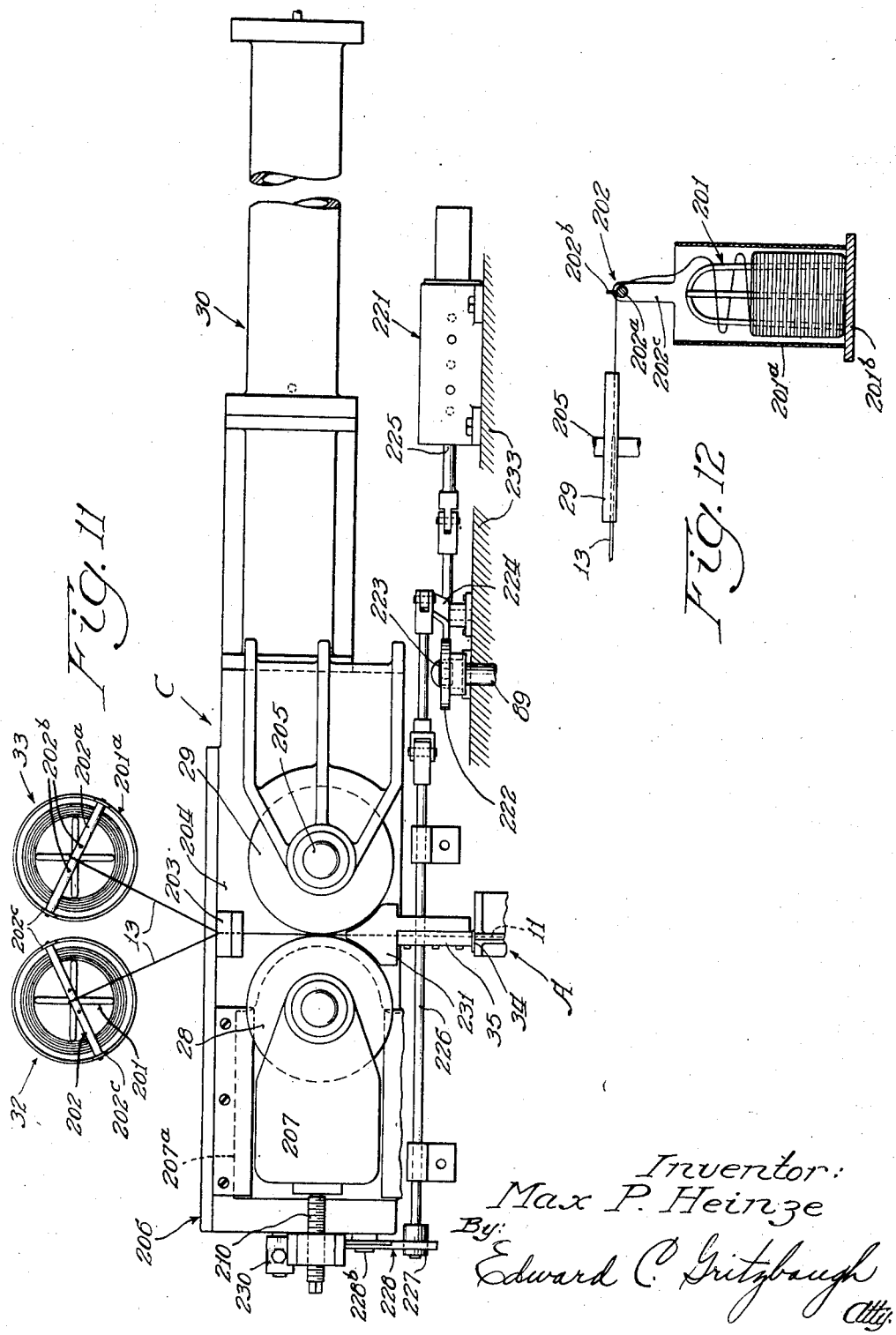

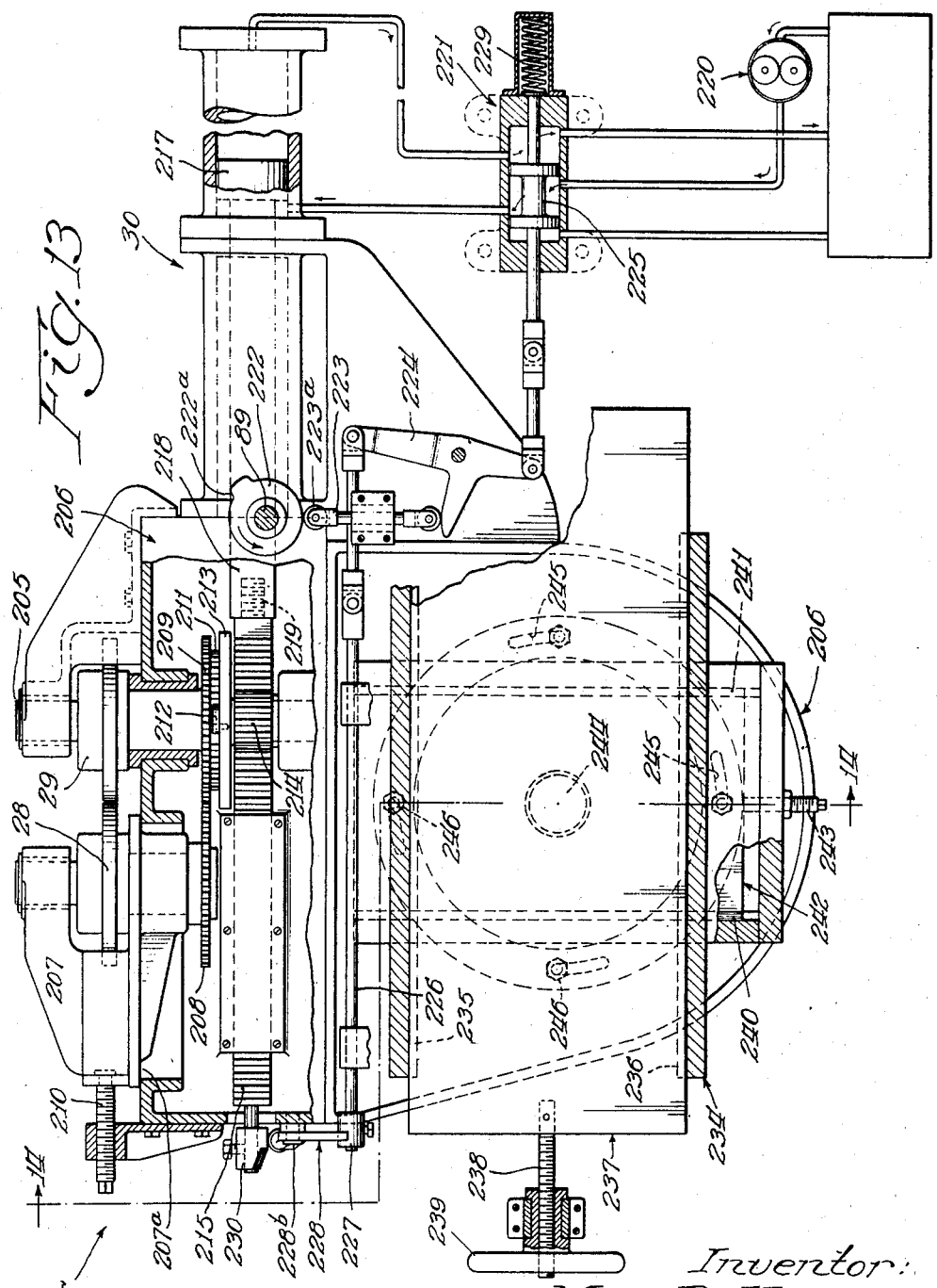

Sept. 10, 1940.                M. P. HEINZE                    2,214,054
                              COMB ASSEMBLY
                         Filed Nov. 7, 1938          15 Sheets-Sheet 12

Inventor:
Max P. Heinze
By:
Edward C. Fritzbaugh
Atty.

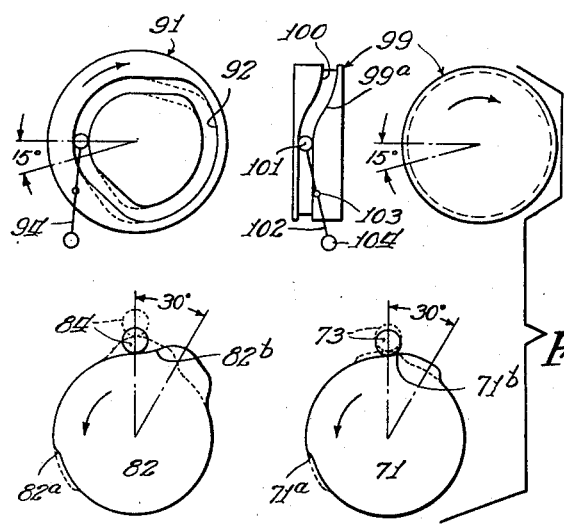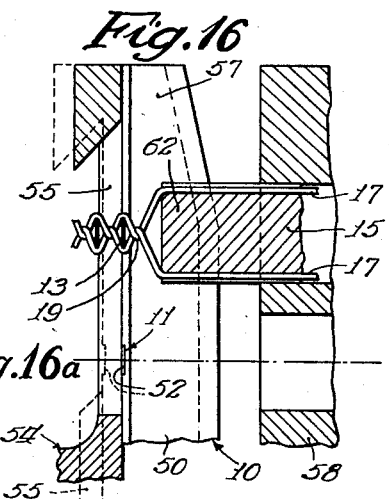
Fig.16
Fig.16a
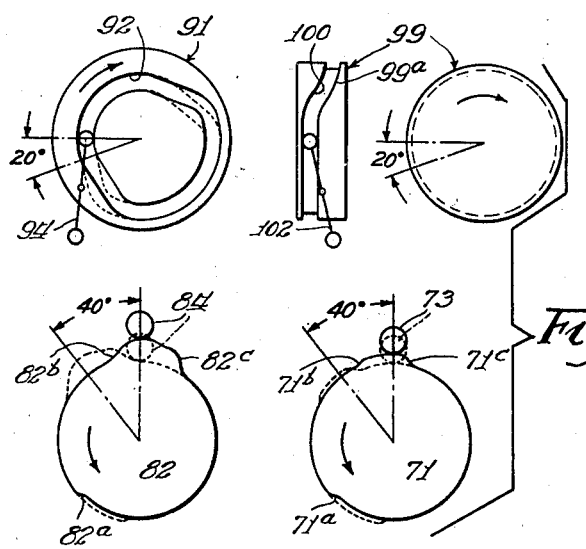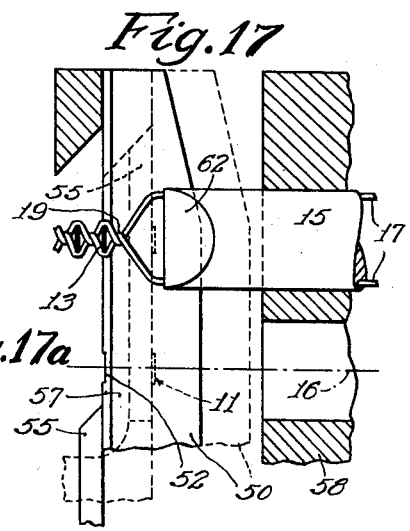
Fig.17
Fig.17a
Inventor:
Max P. Heinze
By: Edward C. Gritzbaugh
Atty.

Sept. 10, 1940.  M. P. HEINZE  2,214,054
COMB ASSEMBLY
Filed Nov. 7, 1938   15 Sheets-Sheet 14
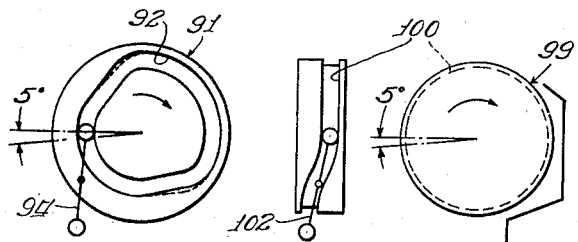
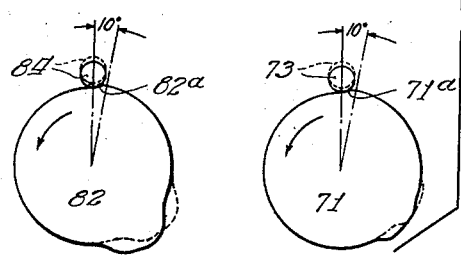
*Fig.18*
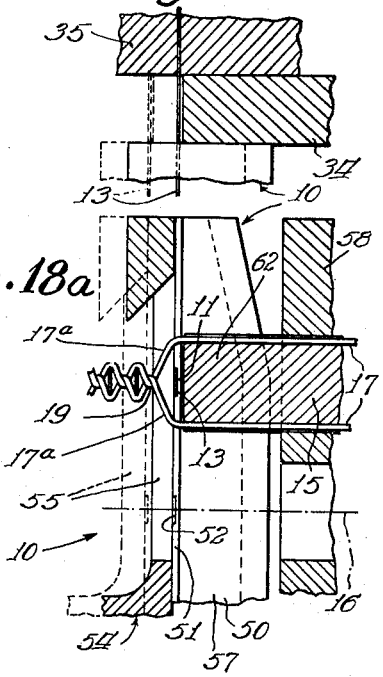
*Fig.18a*
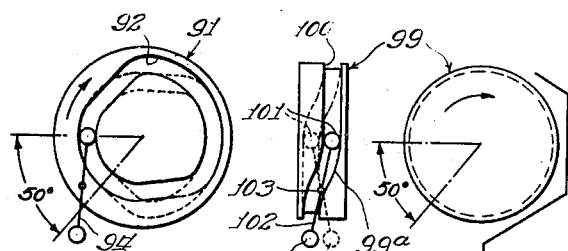
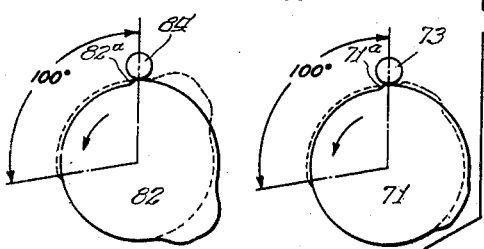
*Fig.19*
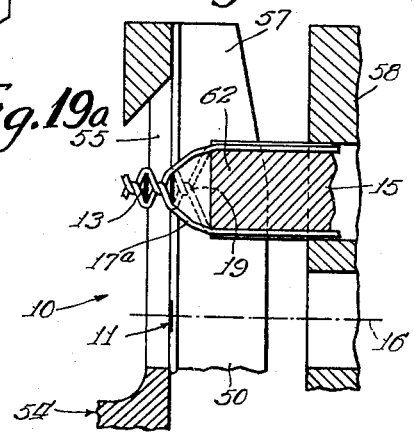
*Fig.19a*
Inventor:
Max P. Heinze
By: Edward C. Gritzbaugh
Atty.

Inventor:
Max P. Heinze
By: Edward C. Fitzhugh
Atty.

Patented Sept. 10, 1940

2,214,054

UNITED STATES PATENT OFFICE 2,214,054

COMB ASSEMBLY

Max P. Heinze, Chicago, Ill., assignor to Borg-Warner Corporation, Chicago, Ill., a corporation of Illinois Application November 7, 1938, Serial No. 239,257

15 Claims. (Cl. 140—5)

This invention relates to an improved weaving head assembly for a wire fabric weaving machine and particularly to a weaving head adapted for use in weaving wire fabric composed of a plurality of longitudinally extending pairs of warp wires and parallel filler wires of elongated cross-section received between the wires of the respective pairs and tied into the fabric by interlocking twists between the respective warp wires of the pairs.

In practicing the method of weaving a metal fabric contemplated by the Grebe Patent No. 2,078,940, considerable difficulty has been encountered in providing efficient holding and spacing means for the successive filler ribbons, while the same are being fastened in the fabric by the relative movement of the respective wires of each pair of warp wires. This problem was rendered still more difficult by the fact that this holding and spacing means was required to open up and release a filler ribbon after the same had been tied in place and to also cooperate in the advancement of the cloth through the machine.

It is an object of the present invention to provide an improved weaving head of the present type including a new arrangement of comb structure for holding a filler ribbon with the major dimension thereof disposed at a predetermined angle to the plane of the cloth and for advancing and releasing the filler ribbon subsequent to the locking of the same in the fabric by the operation of suitable means such for example as a row of rotatable quills operating in combination with the comb structure.

It is a more detailed object to provide a new combination of comb and backplate operable thereon for cooperation with a row of rotatable quills.

It is a still more particular object to provide my improved arrangement of comb and backplate with novel means for effecting the forward and rearward shifting of the entire assembly together with means for raising and lowering the comb on the backplate in sequence with the rotation of the quills.

Another object is to provide in a weaving head assembly, an arrangement of means for simultaneously forming a flat filler wire of elongated cross-section from round wire and injecting the same into the shed whereby to eliminate the difficulty and inefficiency of handling pre-formed elongated filler wires.

The above and other objects, advantages and uses of my invention will become more apparent from a reading of the following specification and claims taken in connection with the appended drawings which form a part of this specification and wherein:

Fig. 1 is a plan view showing schematically an entire machine arranged in accordance with a preferred embodiment of my invention and indicating the relationship of the weaving head, warp wire supply, and rolling mill supply;

Fig. 2 is a front elevation of the weaving head and rolling mill;

Fig. 3 is a right side elevation of the weaving head of Fig. 2 and showing in addition, the centralizing panel together with the forward one of the warp wire spool mounting panels;

Fig. 4 is a section taken substantially on line 4—4 of Fig. 2;

Fig. 5 is a section substantially on line 5—5 of Figs. 2 and 6 showing the comb raising and lowering cam and lever mechanism;

Fig. 6 is broken away plan view taken substantially on the line 6—6 of Fig. 5 and showing the relationship between the comb raising and lowering lever and cam mechanism; and the comb assembly forward and backward shifting arm and cam mechanism;

Fig. 7 is a section substantially on line 7—7 of Fig. 2 showing the rack operating cam and associated mechanism;

Fig. 8 is an enlarged broken away front elevation substantially on the line 8—8 of Fig. 10 showing the comb assembly including the comb proper; the backplate; and the geared quills; innerlying parts being broken away in succession from left to right for the purpose of showing to advantage the interior construction;

Fig. 9 is a section taken substantially on the line 9—9 of Fig. 8 and showing the arrangement of the comb assembly; the quills; and the warp wire supply together with the tensioning means therefor;

Fig. 10 is a plan view in section substantially on the line 10—10 of Fig. 8 and showing the relationship of the wedge-shaped quill noses to the backplate of the comb assembly; the manner of curving the discharge guides on the forward end of the quills; the relationship of the driving rack to the overlapping quill gear teeth; and the arrangement of tensioning means on the rear end of the quills;

Fig. 11 is a plan view of the mill showing the stationary spools of round wire for supplying the flattening rolls and also showing a portion of the cooperating end of the comb assembly including the guide channel together with the cutoff knife for cutting off the flat wires adjacent the side of the comb assembly;

Fig. 12 is a schematic elevation partly in section showing the stationary spool of round wire with the wire being fed from the side thereof to the flattening rolls;

Fig. 13 is a side elevation of the rolling mill partially in section and including a showing of the fluid motor for moving the reciprocating rack for operating the rolls; the control means thereof; and the special adjustable features of the mill;

Figs. 16, 16a through 19, 19a and 20 are schematic views illustrating the successive relative positions of the parts of my machine in carrying out a complete weaving cycle;

Figure 14:
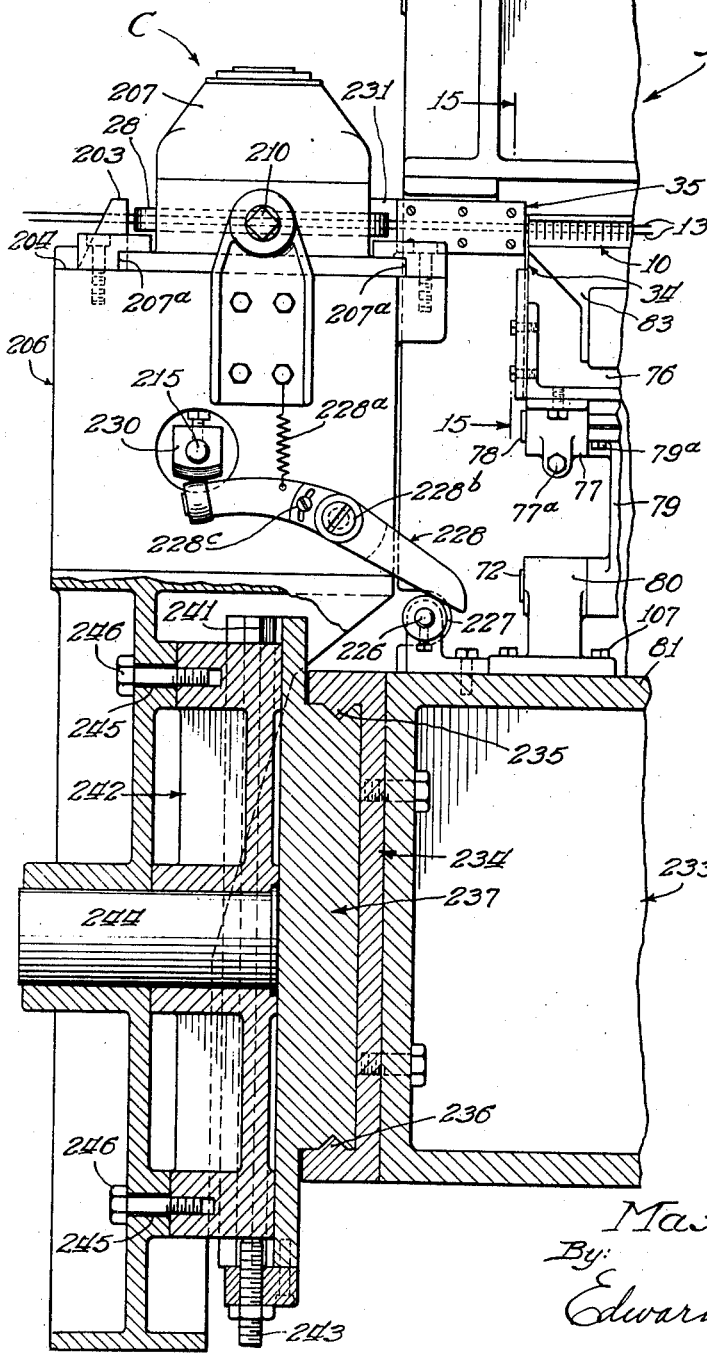
Fig. 14 is a front elevation partly in vertical section substantially on the line 14—14 of Fig. 13.
Figure 15:
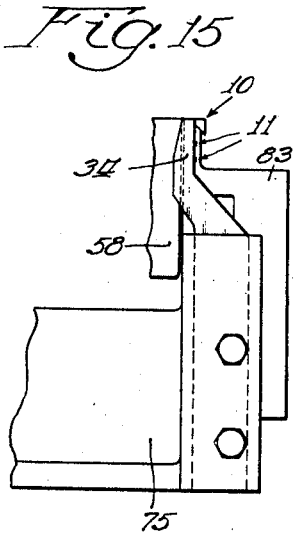
Fig. 15 is an enlarged broken-away sectional view substantially on line 15—15 of Fig. 14 showing the knife cut-off structure.

There is indicated schematically in Fig. 1, the general arrangement of the component parts of a weaving machine with which my improved weaving head structure is particularly adapted for use. My weaving head is indicated generally at A; while a suitable warp wire supply assembly is indicated generally at B; and a suitable filler wire forming an injecting assembly is indicated generally at C.

The weaving head A comprises essentially a comb assembly indicated generally at 10 (see Figs. 4 and 9) formed with a plurality of guideways 11 (see Fig. 8) for guidably receiving filler strands 13 of elongated cross-section cross-wise of a corresponding number of pieces of cloth being simultaneously woven and for holding the same with their major surfaces disposed at a predetermined angle to the planes of the respective pieces of cloth. The comb assembly is further specially formed adjacent the guide and holding means 11 for cooperation with two superimposed rows of rotatable quills referred to generally at 15 and 16 (Figs. 7 and 9), the function of which is to feed a plurality of uniformly spaced pairs of warp wires 17 about the filler strands 13 and to twist the respective warp wires of each pair of warp wires together to form interlocking twists 19 (Figs. 9 and 11 to 15) for securely fastening the filler strands in position in their respective fabrics. The guide and holding means 11 is further arranged to be subsequently opened for advancing and releasing the filler strands preparatory to again being moved to a position therebehind for receiving additional filler strands 13 in said guides for likewise being tied into the cloth by again rotating the quills 15 and 16. Power means is provided in the form of motor driven cams and levers (see Figs. 4 to 7) for effecting the operation of the weaving head assembly in the proper sequence.

While I have shown a plurality of guides 11, one above the other, together with an additional row of quills for cooperation therewith for the purpose of weaving a plurality of pieces of cloth simultaneously, this additional feature is included herein for illustrative purposes only, the same not being part of my invention, but is covered in application No. 239,240 of one Walkley B. Ewing filed simultaneously herewith.

The warp wire supply assembly indicated generally at B in Fig. 1, may comprise a plurality of rotatable tables 21 (Figs. 1 and 3) corresponding in number to the number of quills to be supplied, each table supporting a pair of spools 22 and 23 for supplying pairs of warp wires 17 to each of said quills, these tables being given the same total number of revolutions as the quills by motor 24 through reduction gearing 25 and chain 26 whereby to prevent the twisting together of the warp wires behind the quills. The spool tables 21 are supported on vertical panels 131 there being as many vertical panels as necessary for the number of spools being handled, three being illustrated in the present case. The warp wires 17 are led from their respective spools through flexible conduits to a centralizing panel 130, the flexible conduits associated with the spools mounted on the rearward panels being passed through suitable openings in the forward panels located between the spools mounted thereon. From the centralizing panel 130, the warp wires 17 are lead into the guides on their respective quills (Figs. 9 and 10). Since the specific arrangement of the warp wire supply assembly constitutes no part of the present invention other than as illustrating an operative arrangement and further, since the same is covered in the above referred to application of Walkley B. Ewing, no further detailed description thereof will be given.

As a means for supplying filler wire of elongated cross-section for use in combination with my improved weaving head, I have indicated the same as comprising generally a pair of tangential flattening or elongating rolls 28 and 29 driven periodically in sequence with the weaving head assembly operation by a hydraulic motor 30. These rolls receive round wires from stationary spools 32 and 33 and flatten the same to form wires 13 of elongated cross-section and simultaneously inject these wires into the guide and holding means 11 of my improved comb assembly above referred to. I prefer to arrange the cutoff of the flat filler wire to be effected by the forward shifting movement of the weaving head as indicated in Fig. 2 and later described in greater detail, however, this specific feature is not part of my invention and any other suitable means for effecting the cutoff of the flat filler wire may be employed, such for example, as that disclosed in the patents to Riley 1,647,311 and Lloyd 1,703,276.

*Weaving head assembly*

Referring now in greater detail to the drawings, the comb assembly portion of the weaving head indicated generally at 10 comprises a back plate 50, (Figs. 8 to 10) formed with a plurality of vertical slots 51 therethrough for the passage of pairs of warp wires 17; a pair of channels 52 traversing the forward face thereof and intersecting vertical slots 51 and of the proper size for guidably receiving the ribbon-like filler strands 13; and a vertically reciprocable comb 54 formed with teeth 55 defining slots 56 therebetween corresponding in position to slots 51 in back plate 50. This comb 54 is operable on the face of plate 50 from a position wherein the teeth 55 thereof extend up between the adjacent pairs of warp wires 17 and in which position these teeth are effective to close the channels 52 in the forward face of plate 50 to define the completed guideways 11 above referred to for guidably receiving filler wires 13 of elongated cross-section and holding the same at a predetermined angle relative to the plane of the cloth into which these filler wires are to be woven, to a lowered position wherein the teeth 55 are withdrawn from the cloth and the forward portions of channels 52 are opened to permit of the retraction of the comb assembly backward to withdraw the channels from about the filler strands 13 and to again elevate the comb teeth 55 to close the channels 52 preparatory to the subsequent injection of an additional filler strand therein.

The size and spacing of the slots 51 in back plate 50 will of course be determined by the size of mesh of the material to be woven, the machine herein illustrated having been particularly constructed to fabricate cloth having a mesh of the order of insect screen, the spacing between slots 51 being about ¼ inch, and having a width of about 1/32 inch.

As before stated the interlocking twists between the two warp wires 17 of each pair for locking the filler strands 13 in place are produced by two rows of quills referred to generally at 15 and 16. The backplate 50 is formed with enlarged vertically extending channels 57 (Fig. 10) converging with vertical slots 51 and serving to admit the forward noses of quills 15, 16 to a point closely adjacent channels 52.

The quills are cylindrical in shape, being journalled adjacent their forward and rearward portions in bearing plates 58, 59 and geared together for synchronous rotation by circumferentially formed gear teeth arranged in a particular manner to be described. Each quill is formed with a pair of diametrically disposed coaxial grooves or channels 60 (see Fig. 10) for guidably conveying its corresponding pair of warp wires from the rear end thereof to points of discharge on the forward nose of the quill. These channel guideways pass along the periphery of the quill through the troughs between substantially diametrically opposed pairs of teeth of the quill gear and are brought out in a slight curve 61 to the nose of the quill, the direction of curvature being generally clockwise on all of the quills. The purpose of this arrangement of guideways on the quills is to discharge the respective warp wires of each quill at points lying on diameters of the quills, all of which diameters lie in parallel vertical planes at the time of discharge.

Each of the quills is further formed with a wedge-shaped forward nose 62 (see Fig. 10) to facilitate its entry into channel 57 to a depth closely adjacent the filler strands 13 but spaced slightly out of contact with the channel wall with the long edges 63 of noses 62 all parallel and extending vertically. The guideways 60 discharge the warp wires from the quills at the opposite ends of the edge 63 of the wedge-shaped nose 62, to a preceding interlocking twist 19 (Figs. 9 and 11) thus defining a shed for the reception of a filler strand 13.

An arrangement is provided for effecting the rotation of all the quills synchronously at successive intervals without releasing driving contact therewith. Referring particularly to Fig. 10, the upper row of quills 15 is provided with staggered but overlapping teeth 64 and 65 on alternate quills, while the lower row of quills 16 is provided with teeth 16a extending between bearing plates 58 and 59, the gear teeth of all of the quills being in driving contact. A rack 66 is positioned for engagement first with teeth 64 of the forwardly geared quills and is arranged to be driven to the right as indicated by arrow 67 a distance sufficient to rotate the quills 360° in a clockwise direction to produce interlocking twist between the respective warp wires of each pair.

Rack 66 is subsequently shifted backwards as indicated by arrow 68 in a direction parallel to the teeth thereon to a position in mesh with the teeth 65 of the rearwardly toothed quills and out of contact with teeth 64, preparatory to the subsequent movement of rack 66 to the left as indicated by arrow 69 to again effect the rotation of the forwardly geared quills 360° in a resumed clockwise direction to again produce a row of interlocking twists for tying in a previously injected filler strand 13. The rack is subsequently shifted to the front as indicated by arrow 70 to again bring the teeth thereof into engagement with the forward quill teeth 64 to thus complete a rectangular path preparatory to repeating the cycle.

In order to facilitate the shifting of rack 66 as indicated by arrows 68 and 70, and to make it possible for the rack teeth 66a on the rack 66 to engage the gear teeth of all of the upper quills 15 simultaneously, I have found it desirable to space the teeth 66a in an unorthodox manner. It has been found that the unorthodox spacing of these teeth most conducive to satisfactory operation results when these teeth are spaced a distance equal to that exact divisor of the pitch diameter of the quills most nearly approximated by the product of the pitch diameter of the quill gear teeth and the factor 3.1416 divided by the number of gear teeth on the quill. It is to be noted that the orthodox spacing of these teeth would consist in spacing the same apart an amount equal to the product of the pitch diameter of the quills and 3.1416 divided by the number of gear teeth on the quill, which orthodox spacing would obviously make it impossible for the rack 66 to engage all of the quills 15 simultaneously for any even spacing of these quills. However, with the present spacing of the teeth 66a these teeth are always maintained in positive contact with the quill gear teeth so that there is never any lost motion, while at the same time the rack 66 is readily shifted from teeth 64 to teeth 65 without lifting the rack from contact with the quill gear teeth.

In the present machine employing a pitch diameter $d$ of ¼" and twelve teeth on the quill, the teeth 66a have their centers spaced apart a distance $e$ of 1/16". In other words, there are fewer teeth 66a on the portion $f$ of the rack 66 than would be present on an orthodox rack, namely 8 teeth where an orthodox rack would have 7.639+ teeth.

The transition of the rack from teeth 64 to teeth 65 and back again, is further facilitated by chamfering the ends of the rack teeth as well as the inner ends of teeth 64 and 65 in a well known manner.

The above described particular arrangement of means for effecting the rotation of the quills is not my invention per se but is covered in the above referred to application of Walkley B. Ewing, a description of the same being included herein for the purpose of disclosing a complete and operative combination of which the present contribution is a part as will be more particularly pointed out in the appended claims.

Turning next to the power operating means for moving the comb assembly 10 backward and forward relative to the quills 15 and 16 and for causing the comb 54 to be raised and lowered on the backplate 50 and also to the power means for effecting the movement of the rack 66 in the above described rectangular path, there is provided a plurality of cams driven simultaneously from a common power shaft, these cams acting upon the necessary levers through rises and falls on the cams for causing the requisite movements of the parts.

A cam 71 (Fig. 4) is effective to move the entire comb assembly 10 forward and backward about pivotal supporting shaft 72 by operating on roller 73 mounted on the end of link 74, adjustably connected to arm 75 projecting from the rear of back plate mounting member 76. Backplate mounting member 76 is connected to pivotal supporting shaft 72 through the medium of journals 77 carried on the underside thereof, supporting a transverse shaft 78 which in turn is connected by a plurality of supporting links 79 to transverse supporting shaft 72. This shaft in turn is journalled in comb assembly bearing brackets 80.

A second cam 82 (Figs. 5 and 6) located adjacent cam 71 is effective to cause the vertical reciprocation of comb mounting plate 83 by driving roller 84 mounted on the end of link 85, adjustably connected to arm 86, pivoted intermediate its ends on pin 87, journalled in the above referred to arm 75 and this arm 86 acting through roller 88 on the forward end thereof to raise and lower the comb. Comb mounting plate 83 is slidably received on the forward face of backplate mounting member 76 and is provided with a bearing plate 83 (Fig. 2) for cooperation with roller 88, and mounts comb 54 in the upper portion thereof. This comb is made of a high grade of steel and the teeth 55 are machined therein to a very fine degree of accuracy.

Actuating cams 71 and 82 are mounted on the same shaft 89 driven from a common power shaft 90 (Fig. 1) through reduction gearing 25 by electric motor 24 positioned at the rear of the machine. While I have indicated only one cam 71 and one cam 82, I contemplate the use of two each of these cams being identical in form and located adjacent the respective ends of the shaft 89 for the purpose of effecting a better balance in the operation.

The rollers carried on the ends of links 74 and 85 are held in contact with the corresponding cam by suitable means such as adjustable tension springs 75a and 88a.

The means for effecting the shifting of the rack 66 from the forward gear teeth 64 to the rear quill gear teeth 65 and back again comprises an upper cam 91 (Fig. 4) having an appropriately formed groove 92 therein engaging roller 93 for oscillating forward and backward rack shifting lever 94 mounted on fixed pivot 95 and carrying roller 96 on the opposite end thereof in driving engagement with rack carrier 97. I contemplate the use of two of these cams 91 one adjacent each end of the supporting shaft 98 for the purpose of balancing the operation of the machine.

For effecting the movement of rack 66 to rotate the quill gears there is provided a second or intermediate cam 99 (Figs. 2 and 7) having an appropriately formed cam groove 100 in the face thereof for driving cooperation with the roller 101 mounted in one end of a rack driving lever 102 pivoted intermediate its ends on pin 103 and engaging the rack carrier 97 through a roller 104 carried on the other end thereof for driving the rack back and forth to effect rotation of the quills. Cam 99 is also mounted on shaft 98, the latter being journalled in brackets 105 extending from face casting 106 and base casting 107. Shaft 98 is likewise driven from power shaft 90 but is connected through a reduction gearing whereby cams 91 and 99 are driven at one-half the speed of cams 71 and 82. The reason for this, together with an understanding of the particular sequence of operation of the above described elements of my improved weaving machine will be clearly brought out in the description of operation.

Generally, with reference to the mode of operation the flat strips 13 are first inserted in the guides 11 of the comb assembly 10. The cams 71 next become effective to move the entire assembly slightly forward in order to give the noses 62 of the quill sufficient clearance in order that they may be rotated within grooves 57. This movement takes place entirely about pivots 72, the complete comb assembly being shifted forward in the machine illustrated, a distance of the order of .030 inch relative to the axially stationary quills 15 and 16.

Cam 99 next becomes effective to drive the rack 66 for rotating the quills 360° to produce the integrating twists in the warp wires for locking the filler wire in place. Following this twisting operation, cam 71 again becomes effective to produce a further forward movement of the cam assembly for advancing the cloth a short distance in the present instance about .060 inch, while comb elevating and lowering cams 82 (Fig. 5) operate to lower comb teeth 55 from between the warp wires and to uncover the channels 52. Cams 71 next become effective to withdraw the entire comb assembly backward, thus removing the channels from about the filler wires 13 while cams 82 become effective to again raise the comb teeth 55 to a position between the warp wires where these teeth again cover the forward portion of channels 52 to define guideways 11 for the reception of additional filler wires.

*Filler ribbon supply assembly*

Referring in greater detail to Figs. 11 through 15, the preferred embodiment of my filler wire forming and injecting means comprises a pair of flattening and injecting rolls 28 and 29 which receive round wire from stationary spools 32 and 33, and roll the same to produce filler wires 13 of elongated cross-section and to inject the same into the guideways formed in the comb assembly.

The spools of round wire remain stationary, the wire being drawn from the side of the spool over guides, indicated generally at 201, 202, thence to a guide 203 on the mill table 204, from which it is delivered to the flattening faces of rolls 28 and 29.

The spools 32 and 33 are preferably received in a cylinder 201a supported on a base 201b and provided at its open outer end with a bracket 202c supporting guide means 202. The guide 202 is preferably composed of a bar 202a having a pair of radially extending pins 202b effective to confine the wire therebetween (Figs. 11 and 12).

The formation from round wire of filler wire or ribbon of elongated cross-section simultaneously with the injection of this wire into the shed of the fabric being woven, is an important feature of my invention in that among other things it avoids the inconvenience and unsatisfactory procedure of handling and injecting pre-formed filler ribbon.

The stationary supply spool arrangement for feeding the round wire to the flattening rolls is of particular advantage in the relation disclosed, since it renders unnecessary the usual arrangement of rotatable spool support and brake therefor, and otherwise simplifies this portion of the machine. The use of this stationary feed is made possible in the present combination by virtue of the fact that the round wire that is drawn off of the side of stationary spools 32 and 33, even though becoming twisted in being so drawn, the passage of this twisted wire through the flattening rolls results in a wire of elongated cross-section that is completely acceptable for the present purpose.

While I have disclosed this specific arrangement of spools 32 and 33 for feeding round wire to the flattening rolls 28 and 29, and use the same in practice, I nevertheless contemplate other arrangements for feeding a round wire to the flattening rolls as coming within the broad scope of my invention. The specific arrangement of supply rolls 32 and 33 providing for these rolls remaining stationary and the round wire being fed from the side thereof to the flattening rolls is not part of my invention.

Flattening roll 29 is mounted on shaft 205 supported in suitable journals on the mill frame indicated generally at 206 (Figs. 11 and 13). Tangential flattening roll 28 is journalled in a unitary yoke 207 (Figs. 11 and 13), and geared to tangential flattening roll 29 through gears 208 and 209. Yoke 207 is supported in guideway 207a for moving flattening roll 28 relative to flattening roll 29 in order to adjust the thickness of the elongated strips. The position of yoke 207 is controlled by adjusting screw 210 for varying the thickness of the flat filler wire.

The flattening rolls are driven periodically in sequence with the operation of the comb and quill assembly through a pawl clutch including a ratchet gear 211 (Fig. 13) and ratchet 212, mounted on a plate 213 connected to a gear 214 driven by a rack 215, in turn motivated by a fluid motor indicated generally at 30.

The fluid motor 30 is of a well known type comprising a reciprocable piston connected by a piston rod 218 through the usual liquid seal (not shown) to the rear end of the rack 215 to which it is in turn fastened by any suitable means such as a threaded connection 219.

Fluid power for operating piston 217 is supplied by a pump 220 through a two-way valve 221 effective to control the supply of pressure to either side of the piston depending upon the position of the valve 221. This two-way valve is under the control of a cam 222 mounted on shaft 89 along with the comb assembly actuating cams 71 and 82. Cam 222 becomes effective at the beginning of the last 180 degrees of rotation of shaft 89 to depress link 223 which in turn operates bell crank 224 to shift valve 221 to the right, and thus cause the same to deliver fluid pressure from pump 220 to the rear side of piston 217. Bell crank 224 is further effective to move control rod 226 against the resistance of compression spring 229 (Fig. 13) to a point where collar 227 carried thereon permits link 228, urged by spring 228a, to drop in front thereof to thus hold control valve 225 in the position to which it was moved. Piston 217 is now subjected to fluid pressure, and drives rack 215 to the left in Fig. 13 until cam 230 carried on the forward end of rack 215 contacts the upper end of link 228, thus lifting the same out of locking relationship with respect to collar 227, and permitting spring 229 to shift plunger 225 of valve 221 to the left in Fig. 13, thus changing the delivery of fluid pressure to the opposite side of piston 217, and causing the return of the rack preparatory to again driving the rolls. The ratchet and pawl 211 and 212 operate to drive the rolls in one direction only, namely, in the feeding direction and permit of the free return of th rack to its initial driving position. Provision for adjustment in the operation of locking lever 228 is made by hinging the two ends of the lever at 228b and clamping these two end portions together in their adjusted positions by clamping screw 228c.

While I have shown a ratchet and pawl one-way drive arrangement, it is quite apparent that other forms of one-way drive may be employed, such for example, as the well known free-wheeling clutch disclosed in the patent to Leschorn No. 1,684,838.

Adjustment of the rolling mill assembly to provide for the proper registry of the discharge guide 231 and cutoff block 35 with the receiving guideways 11 of the comb assembly when the machine is adjusted for weaving fabric having the flat filler wires locked therein at different angles to the plane of the fabric, is provided by the special construction of the mounting for supporting the mill frame 206 from the weaving head main frame indicated generally at 233 (Figs. 2 and 14). This arrangement includes a first horizontal guideway defining member 234 provided with a pair of opposed horizontal tongues 235 and 236 adapted to guidably confine an intermediate adapter member 237. The adapter 237 is horizontally adjusted along guides 235, 236, by means of screw 238 under the control of handwheel 239. Adapter 237 is formed with vertically confining guide tongues 240 and 241 for receiving and confining an auxiliary adapter member 242 which is vertically adjustable along guides 240, 241 by means of adjusting screw 243. Auxiliary adapter 242 has shaft 244 journalled therein which in turn supports rolling mill frame 206. The rolling mill frame is made adjustable about shaft 244 and relative to auxiliary adapter member 242 by provision of arcuate slots 245 formed in mill frame member 206 for cooperation with clamping screws 246 passing through these slots and effective to clamp the frame member 206 to auxiliary adapter member 242.

It will thus be seen that the rolling mill frame 206 can be readily adjusted horizontally, vertically and pivotally to bring the delivery channel of the shearing block 35 into precise alignment with the receiving guide-way channels 11 of the comb assembly.

While I have disclosed a novel arrangement for fabricating the flat filler ribbons simultaneously with the operation of injecting the same into the shed, and employ this arrangement in practice because of its novel advantages, I, nevertheless, contemplate the use of machines wherein pre-formed filler wires are employed as coming within the broad scope of my invention.

The specific form of the mill including the adjustable structure and the control mechanism is not part of my invention.

*Sequence of operation*

Referring to Figs. 16, 16a through 19, 19a, and 20 for further detail of the operation, I have indicated schematically the successive relative positions of the parts of the weaving head in weaving a piece of cloth, the solid lines in Fig. 16 representing the position occupied by the parts just prior to the beginning of the interlocking twist operation. Comb teeth 55 are in raised position on backplate 50 of comb assembly 10, thus closing guide channel 52 in backplate 50 to define guide 11. A filler ribbon or wire 13 of elongated cross-section has previously been injected in position in the guide 11. The wedge-shaped noses 62 of quills 15 are each positioned within the vertically aligned grooves 57 in the backplate 50, but out of contact therewith. The lower row of quills 16 are omitted from Figs. 11 to 15 for simplification. The warp wires 17 pass along the diametrically disposed guideways in each of the quills to the ends of the wedge-shaped nose 62 thereof, thence to the preceding twist 19 to define a plurality of sheds embracing the previously injected filler wire 13.

The disposition of parts indicated in solid lines in Fig. 16 will be referred to as the zero or starting point for purposes of reference.

As already pointed out in the detailed description, there is provided four cams for effecting the sequence of operation of the weaving head, namely, forward and rearward rack shifting arm 91; rack reciprocating quill rotating cam 99; forward and backward comb assembly shifting cam 71; and comb raising and lowering cam 82, the latter two cams being rotated at twice the speed of the first two for reasons that will appear from the operation of the machine. These cams are driven simultaneously from power shaft 90 as already pointed out. These cams are indicated schematically in the progressive positions occupied thereby in Figs. 16a through 19a and 20.

The first step in the operation of the weaving head from the zero position, is the forward shifting of the entire comb assembly 10 about its pivot 72 (see also Fig. 4) to move the grooves 57 away from the wedge-shaped noses 62 of the quills in order that the quills may be rotated for effecting the integrating twists 19. This movement is caused by a rise 71a during the first ten degrees of rotation of forward and backward comb assembly shifting cam 71 in its movement from the zero position. Roller 73 rides up upon rise 71a to actuate arm 75 connected to backplate 50 to thus move the comb assembly about its pivot 72, while rise 82a on comb raising and lowering cam 82 acts on roller 84 to effect a synchronizing vertical movement of comb teeth 55. During this ten degree arcuate movement of cams 71 and 82, and the corresponding five degree movement of cams 91 and 99, the rollers in contact with the latter cams are inactive, or, in other words, pass along idle or dwell portions of their respective cams. The withdrawn or forward position of the channeled backplate 50 is indicated in dotted lines in Fig. 16, while the initial position at the zero or starting point is indicated by solid lines in the same figure. This method of presenting the transition from one position of the parts to a succeeding position will be followed in the subsequent figures.

A second important step in the operation of my weaving head that takes place during the first ten degrees of rotation of cam 66, is the cutting off of the filler strip 13 adjacent its point of entry in guide channel 11. This cutoff operation is effected by the forward movement of the comb assembly relative to a stationary shearing head 35 mounted on the rolling mill when the comb assembly is moved forward by the operation of rise 71a on roller 73. To facilitate this shearing operation, the comb assembly 10 has mounted thereon knife blades 34 for more effectively shearing the filler wire 13 as the comb assembly 10 is moved forward.

Turning now to Figs. 17 and 17a, the next step of effecting the integrating twist is illustrated. The position of the shed forming portions 17a of the warp wires 17 at the beginning of this twisting step is indicated in solid lines, while the position of these wires following the rotation of the quills to produce the twist 19 is shown in dotted lines. The rotation of the quills to produce this twist 19 is caused by a rise 99a on cam 99 during the next fifty degrees of rotation of this cam. This rise 99a operates on roller 101 to turn lever 102 about its pivot 103 to cause a sufficient movement of the quill rack 66 crosswise of the fabric to rotate the quills 360°. The rollers on the remaining cams ride on idle or dwell portions thereof during this quill rotation. The filler wire is now locked in place by the integrating twist 19 preparatory to the withdrawal of the comb teeth 55 and the repositioning thereof behind this filler wire, and the injection of a subsequent filler wire.

Progressing to Fig. 18 and 18a, the third step in the operation of the weaving head comprises a secondary forward shift of the comb assembly and the withdrawal of the comb teeth 55 from between the pairs of warp wires and from in front of guide channel 52 for the purpose of advancing and releasing the cloth. The position occupied by the parts of the comb and quills at the beginning of this step is indicated in solid lines, while the position occupied by the parts at the end of this step in the operation is indicated in dotted lines. The secondary forward shift of the comb assembly for the purpose of advancing the filler wire 13 and the cloth to a position slightly beyond that occupied at the beginning of the operation taking place in Fig. 17, is effected by a rise 71b on cam 71 during the next 30 degrees of its rotation.

The dropping of the comb teeth 55 to clear the cloth and the guide channel 52 is begun simultaneously with the above referred to secondary forward movement of the comb assembly and is caused by a rise 82b during the above referred to thirty degrees of arcuate movement of cam 82. Rise 82b acts on roller 84 mounted on the outer end of lever 85 (see also Fig. 5), the forward end of which carries a second roller 88, causing the same to lower comb teeth 55 on backplate 50. The parts are now in the position indicated by dotted lines in Fig. 18 with the comb teeth 55 in the wide open position, and the comb assembly 10 advanced to its forwardmost position relative to the noses of the quills, preparatory to the rearward movement of the comb assembly and the lifting of the comb teeth 55 behind the filler wire 13 to again close the channel guide 52 for the reception of a subsequent filler wire 13, as will now be described in connection with Fig. 19.

Proceeding now to Figs. 19 and 19a, the next step in the operation comprises the rearward movement of the comb assembly, withdrawing guide channels 52 from about filler wire 13 and the raising of the comb teeth 55 behind filler wire 13 into their original elevated position to again close channel 52 to define guide and holding means 11 for the reception of a subsequently injected additional filler wire 13. This movement is caused by falls on cams 71 and 82 respectively. Again the initial position of the parts at the beginning of the operation illustrated in Fig. 19 is shown by solid lines while the final position of these parts is indicated in dotted lines. Fall 71c on cam 71 during the first ten degrees of the operation illustrated in Fig. 19, allows the roller 73 to be lowered to its normal dwell or idling level to thus retract the comb assembly to its rearmost position with the quill noses 62 in their deepest position within the grooves 57 in backplate 50. Fall 82c on comb actuating cam 82 becomes effective simultaneously with fall 71c to cause the raising of comb teeth 55. The operation of fall 82c overlaps that of fall 71c extending over an arc of forty degrees. The parts are now in the relative position indicated by dotted lines in Fig. 19 and prepared for the reception of a laterally injected filler wire 13 into the guide 11 defined by channel 52 and comb teeth 55.

Figure 20:
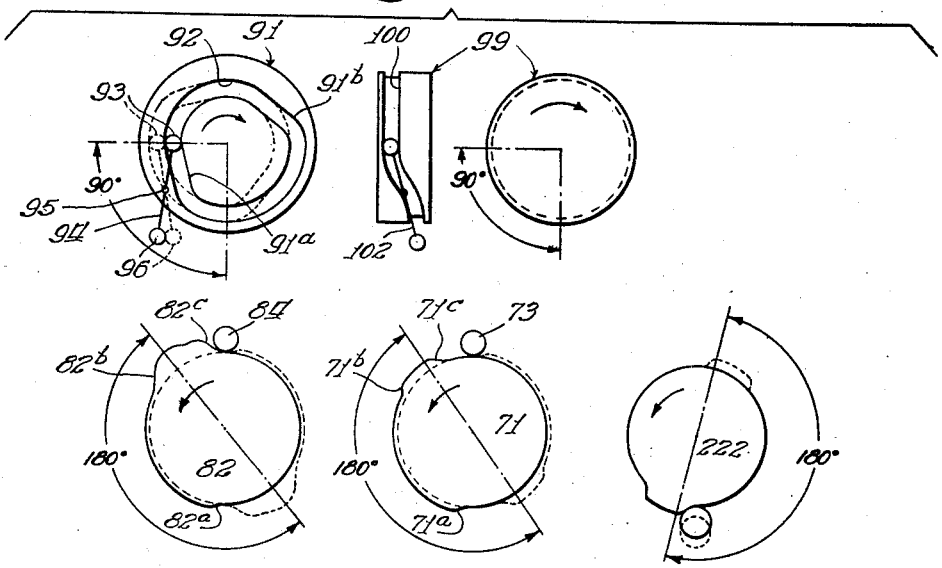

Passing on to Fig. 20, the last step in the operation of my weaving head assembly through a complete cycle comprises the injection of a filler wire 13 into the guide 11 and the shift of the rack 66 from engagement with the forward quill gear teeth 64 to engagement with the rear quill gear teeth 65 as indicated by arrows in Fig. 10. The hydraulic motor control cam 222 mounted on shaft 89 along with cams 71 and 82 (Fig. 1) becomes effective through a rise thereon to operate mechanism indicated generally at 222a for causing the operation of hydraulic motor 30 to drive the flattening rolls 28 and 29 to feed a flat filler ribbon into guide 11. Since the specific arrangement of control means forms no part of the present invention and is fully described in the above referred to applications of Ewing and Patten, no further description, therefore, will be given herein.

A second operation that takes place simultaneously with the forming and feeding of a flat filler ribbon is the shifting of rack 66 from engagement with the forward teeth 64 to engagement with the staggered rear teeth 65 as indicated by arrow 68 (Fig. 10). This shift is effected by cam groove 91a of rack shifting cam 91 acting on roller 93 to turn lever 94 about its pivot 95 to shift collar 96 on the other end thereof from its solid to its dotted line positions (see also Fig. 4). Roller 96 operates to shift rack carrier 97 rearwardly as indicated by arrow 68 in Fig. 10. The return shift indicated by arrow 70 is effected at a subsequent time by corresponding cams 91b formed on cam 91 and likewise cooperating with roller 93 on lever 94.

During the above operation of forming and feeding a filler ribbon 13 and effecting a shift of the rack 66, the remaining cams 71, 82 and 99 present idle or dwell portions of their surfaces in contact with their respective rollers.

When cams 71, 82 and 222 have passed through the 180° devoted to these last two operations comprising the last step, the apparatus is again at the zero or starting point preparatory to repeating the above described cycle of operations. It will be noted that the subsequent tying step will be effected by the rack 66, which is now in engagement with the teeth 65 of the rearwardly geared quills 15, being shifted in the direction indicated by the arrow 69 which is opposite to the above described shift indicated by arrow 67. However, since the teeth 64 and 65 overlap the respective quills will be driven in the same direction as that in which they were driven for effecting the above described locking twist, namely, quills 64 will be rotated clockwise and quills 65 will be rotated counterclockwise.

No attempt is made in Figs. 11 to 20 to bring out the complete detailed construction of each of the cams, since to do so would unduly confuse the reader in attempting to understand the fundamental movements involved. The further details as to the formation of these cams is brought out in the master timing chart shown in Fig. 21 wherein the rises, dwells and falls on each cam are indicated in their arcuate relationship in a composite manner.

Figure 21:
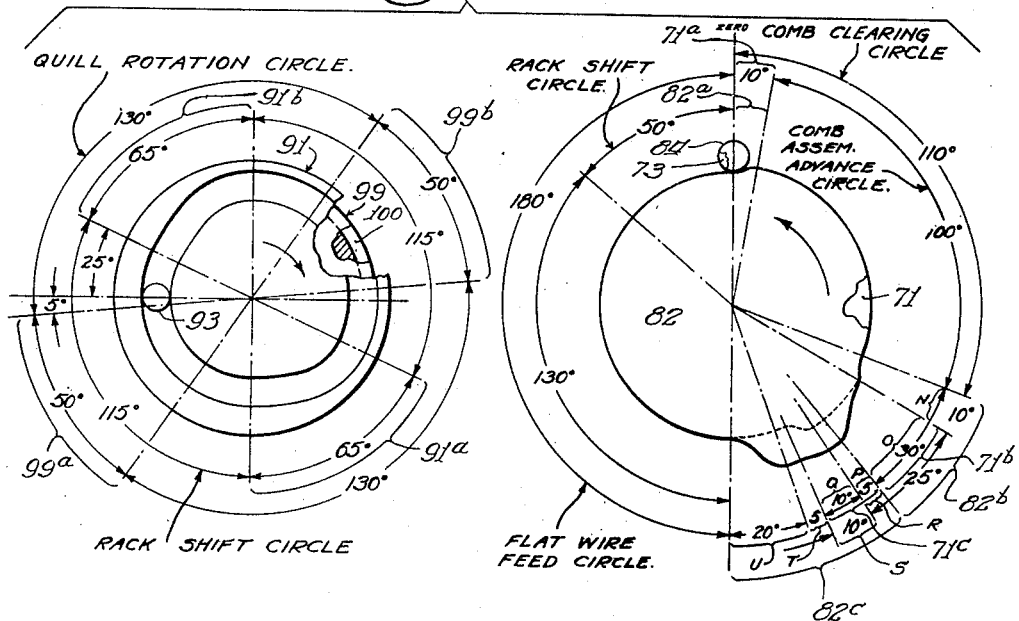
Fig. 21 shows the composite timing chart of my machine.

Referring to Fig. 21 it will be seen that in the actual embodiment of the machine, section 71b of comb assembly forward and rearward shifting cam 71 is composed of a first 10° rise indicated at N followed by a 20° pause or dwell portion indicated at 0, the function of the former being to effect the secondary forward movement of the comb assembly, while the function of the latter is to maintain this forward position of the comb assembly while the comb teeth are being lowered to their lowermost position.

Section 71c is composed first of 5° dwell or adjustment arc P followed by a 10° fall Q which is effective to bring the comb assembly back to its rearmost position. The adjustment arc P is introduced for mechanical reasons to give a brief time for adjustment of the parts before making the subsequent transition.

Section 82c of comb raising and lowering cam 82 is composed of first a 5° dwell arc R corresponding to dwell P of section 71c, and having the same function of providing for adjustment time; followed by a 10° synchronizing fall arc S, the function of which is to synchronize the movements of the comb assembly 10 including the movement of the comb 54; followed by another 5° pause arc T having the function of providing adjusting time before the next transition; and finally a 20° fall U to normal elevation effective to cause the lifting of the comb 54 back to its highest position on the backplate 50.

While I have indicated certain specific allotments of arcs on the cams for effecting the respective movements, it is quite apparent that this may be varied within a desired range to suit particular operating conditions.

My invention has been described in connection with a specific embodiment thereof, however, it is to be understood that this is by way of illustration and not by way of limitation, and the scope of my invention is defined solely by the appended claims which should be construed as broadly as the prior art will permit.

I claim:

1. In a fabric weaving machine, means adapted to guidably receive and hold a laterally introduced filler strand, said means being formed with perforations therethrough receiving longitudinally extending warp strands about said filler strand, and means for moving adjacent warp strands in different directions relative to the median plane of the fabric to fasten said filler strand in said fabric, said first named means comprising a plate having a channel formed in the face thereof transverse of said fabric, said channel being provided with means operable on the face of said plate to open and close said channel to release said filler strand for advancing the fabric preparatory to reclosing and receiving a subsequent filler strand.

2. In a fabric weaving machine, means adapted to guidably receive and hold a laterally introduced filler strand, said means comprising a plate having a transverse filler wire guide slot in the forward face thereof, a plurality of passages through said plate and intersecting said guide slot providing for the passage of warp wires about said filler strand in said guide slot, a comb operable on the forward face of said plate and having teeth movable between said warp wires and effective to open and close said guide slot and means for moving adjacent warp strands in different directions relative to the median plane of the fabric to fasten said filler strand in said fabric.

3. In a weaving head for weaving wire cloth, a backplate formed with a plurality of openings therethrough for the passage of warp wires, a transverse channel on the forward face of said backplate intersecting said openings, a comb having teeth reciprocable on the forward face of said backplate from a position wherein said teeth pass between adjacent warp wires and close said channel to a position wherein said teeth are withdrawn and said channel is open, feeding means adapted to feed said warp wires and to move adjacent warp wires in opposite directions away from the median plane of the fabric to define a shed, said transverse channel being positioned within said shed to guidably receive a filler wire adapted to be injected from the side of the cloth and to hold the same in spaced relationship with respect to a preceding filler wire, said warp wire feeding and moving means being operable subsequent to the introduction of said filler wire to move said respective warp wires in the opposite direction away from the median plane of the fabric to thereby fasten said filler wire into said cloth preparatory to the introduction of a subsequent filler wire and means for operating said comb and said warp wire feeding and moving means in sequence.

4. In a weaving head for a wire cloth weaving machine, a backplate having a plurality of passageways formed therethrough for the passage of a plurality of warp wires, a transverse channel in the forward face of said backplate intersecting said passageways, a reciprocable comb having teeth operable on the forward face of said backplate from a position wherein said teeth are positioned between adjacent warp wires and close said channel to define a guide way for the side injection of a filler wire therein, to a second position wherein said teeth are withdrawn from between said warp wires and said channel is open, means for feeding said warp wires and moving adjacent ones thereof respectively above and below the center line of said channel whereby to define a shed for the reception of a laterally injected filler wire and subsequently moving said adjacent warp wires in the opposite direction for fastening said filler wire into the cloth, and power means effective to operate said comb and warp wire feeding means in sequence.

5. In a comb assembly for the weaving head of a wire cloth weaving machine, a backplate, a comb, a row of rotatable quills, said backplate being formed with a plurality of openings therethrough for the passage of a plurality of pairs of warp wires, said quills being positioned for feeding said warp wires therethrough and twisting the same together, said backplate being further provided with a transverse channel intersecting said openings, said comb comprising a plurality of teeth receivable between the pairs of warp wires and operable on the face of said plate to effect the opening and closing of said channel, said comb and channel defining a holding and spacing means for filler strips of elongated cross-section adapted to be introduced therein with their long sides at an angle to the plane of the cloth and positioned between the wires of each of said pairs of warp wires whereby the twisting of said warp wires together by the rotation of said quills is effective to lock said strips in said cloth, the subsequent opening of said guide by the movement of said comb being effective to release said filler strips therefrom, and power driven cam means for controlling the operation of said comb assembly and said quills in sequence.

6. In a comb assembly for the weaving head of a wire cloth weaving machine, a backplate formed with a plurality of openings therethrough for the passage of pairs of warp wires, a comb, a row of rotatable quills for feeding said warp wires therethrough and twisting the same together, said backplate being further provided on its forward portion with a transverse channel, said comb being reciprocable on said plate for the introduction of the fingers thereof between said pairs of warp wires and effective to close said channel, said channel defining a holding and spacing means for filler strips of elongated cross-section adapted to be introduced therein with their long sides at an angle to the plane of the cloth and between the wires of each of said pairs of warp wires whereby the twisting of said warp wires together by the rotation of said quills is effective to lock said strips in place in the cloth, the said opening of the channel by the movement of said comb teeth being effective to release said filler strips from said channel subsequent to the twisting operation and power driven cam means for effecting the operation of said comb assembly and said quills in sequence.

7. In a comb assembly for the weaving head of a wire cloth weaving machine, a backplate formed with a plurality of parallel slots therethrough for the passage of pairs of warp wires, a row of rotatable quills positioned adjacent said slots for feeding said pairs of warp wires therethrough and twisting the same together to define a shed, a guide and holding means for the reception of filler strips of elongated cross-section within said shed and for positioning the same with their long sides at an angle to the plane of the cloth, said guide and holding means comprising a transverse channel on the forward face of said backplate, a comb having teeth operable on said plate from a position wherein said teeth extend between said pairs of warp wires and close said channel to thereby define said guiding and holding means for the filler strips to a position where said teeth are removed from between said pairs of warp wires and said channel is opened to permit of the advancement of the cloth and the subsequent reclosure of said channel behind said filler strip by said comb teeth preparatory to the introduction of a subsequent filler strip, and power driven means for effecting the operation of said comb assembly in sequence.

8. In a weaving head for weaving wire cloth, a backplate formed with a plurality of openings therethrough for the passage of warp wires, a transverse channel on the forward face of said backplate intersecting said openings, a comb having teeth reciprocable on the forward face of said backplate from a position wherein said teeth pass between adjacent warp wires and close said channel to a position wherein said teeth are withdrawn and said channel is open, feeding means adapted to feed said warp wires and to move adjacent warp wires in opposite directions away from the median plane of the fabric to define a shed, said transverse channel being positioned within said shed to guidably receive a filler wire adapted to be injected from the side of the cloth and to hold the same in spaced relationship with respect to a preceding filler wire, said backplate being further characterized by the provision of a wedge-shaped cam positioned adjacent the upper edge of said comb teeth adjacent the closed position thereof for cooperation with a correspondingly shaped cam surface on the ends of said teeth for the purpose of effecting the closure of said teeth when said comb is moved in the closing direction, said warp wire feeding and moving means being operable subsequent to the introduction of said filler wire to move said respective warp wires in the opposite direction away from the median plane of the fabric to thereby fasten said filler wire into said cloth preparatory to the introduction of a subsequent filler wire and means for operating said comb and said warp wire feeding and moving means in sequence.

9. In a weaving head for weaving wire cloth, a backplate formed with a plurality of openings therethrough for the passage of warp wires, a transverse channel on the forward face of said backplate intersecting said openings, a comb reciprocable on the forward face of said backplate and having teeth movable from a position wherein said teeth pass between adjacent warp wires and close said channel to a position wherein said teeth are withdrawn and said channel is opened, means defining a pivotal support for said backplate and comb, feeding means adapted to feed said warp wires and to move adjacent warp wires in opposite directions relative to the median plane of the fabric to define a shed, said transverse channel being positioned within said shed to guidably receive a filler wire adapted to be injected from the side of the cloth and to hold the same in spaced relationship with respect to a preceding filler wire, said warp wire feeding and moving means being operable subsequent to the introduction of said filler wire to move said respective warp wires in the opposite directions away from the median plane of the fabric to thereby fasten said filler wire into said cloth preparatory to the introduction of a subsequent filler wire, and means for operating said comb and backplate about said pivotal support and for operating said comb between said open and closed positions on said backplate.

10. In a weaving head for weaving wire cloth, a backplate formed with a plurality of openings therethrough for the passage of warp wires, a transverse channel on the forward face of said backplate intersecting said openings, a comb having teeth reciprocable on the forward face of said backplate from a position wherein said teeth pass between adjacent warp wires and close said channel to a position wherein said teeth are withdrawn and said channel is open, said backplate being provided on the forward face thereof with a cam surface located adjacent the ends of said comb teeth in the closed position thereof and cooperating with a complementary cam surface formed on the ends of said teeth for effecting complete closure of said teeth against said backplate, feeding means adapted to feed said warp wires and to move adjacent warp wires in opposite directions away from the median plane of the fabric to define a shed, said transverse channel being positioned within said shed to guidably receive a filler wire adapted to be injected from the side of the cloth and to hold the same in spaced relationship with respect to a preceding filler wire, said warp wire feeding and moving means being operable subsequent to the introduction of said filler wire to move said respective warp wires in the opposite direction away from the median plane of the fabric to thereby fasten said filler wire into said cloth preparatory to the introduction of a subsequent filler wire and means for operating said comb and said warp wire feeding and moving means in sequence.

11. In a weaving head for weaving wire cloth, a backplate formed with a plurality of openings therethrough for the passage of warp wires, a transverse channel on the forward face of said backplate intersecting said openings, a comb having teeth reciprocable on the forward face of said backplate from a position wherein said teeth pass between adjacent warp wires and close said channels to a position wherein said teeth are withdrawn and said channel is open, means defining a pivotal support for said backplate, feeding means adapted to feed said warp wires and to move adjacent warp wires in opposite directions away from the median plane of the fabric to define a shed, said transverse channel being positioned within said shed to guidably receive a filler wire adapted to be injected from the side of the cloth and to hold the same in spaced relationship with respect to a preceding filler wire, said warp wire feeding and moving means being operable subsequent to the introduction of said filler wire to move said respective warp wires in the opposite direction away from the median plane of the fabric to thereby fasten said filler wire into said cloth preparatory to the introduction of a subsequent filler wire, means for operating said comb and warp wire feeding and moving means in sequence comprising, an arm extending rearwardly from said backplate and a cam operable upon said arm adjacent its other end effective to move said backplate and comb carried thereon about said pivotal support, a lever pivotally supported intermediate its ends on said arm with the forward end portion thereof in operable engagement with said comb for raising and lowering the same and the rear end thereof arranged for cooperation with a second cam for effecting the movement of said lever, a rack for effecting the rotation of said quills and cam means for moving said rack.

12. In a wire fabric weaving machine having a weaving head assembly comprising means for guidably receiving and holding laterally injected filler strands of elongated cross-section, said holding means being formed with openings therethrough receiving longitudinally extending warp strands about said filler strand, and means for moving adjacent warp strands in opposite directions relative to the median plane of the fabric for fastening said filler strand in said fabric, the combination therewith of means for supplying said elongated filler wire comprising a pair of forming rolls operable in conjunction with said weaving head assembly, means adapted to lead a supply of wire to said rolls to be formed and directed into said guiding and holding means.

13. In a wire fabric weaving machine including means for guidably receiving and holding laterally injected filler wire of elongated cross-section, means for feeding pairs of warp wires about said filler wire, means for moving adjacent warp wires in opposite directions relative to the median plane of the fabric to fasten said filler wire in said fabric, the combination therewith of a pair of flattening rolls for simultaneously rolling a round wire to produce a flat wire of elongated cross-section and injecting the same into said guide means, and means for operating said flattening rolls in alternate sequence with said means for moving adjacent warp strands in opposite directions.

14. A weaving machine for weaving wire cloth composed of a plurality of definitely spaced pairs of warp wires extending lengthwise of the cloth and a plurality of definitely spaced filler wires of elongated cross-section extending transversely across the cloth with their long sides disposed at a predetermined angle to the plane of the cloth and locked in position by integrating twists between the two wires of each of said pairs of warp wires, said machine including a weaving head, warp wire supply means, filler wire supply means and power means for driving said first named means, said weaving head comprising means for feeding said warp wires from said warp wire supply means and moving adjacent warp wires in opposite directions away from the median plane of the cloth to define a shed and guide means effective to guide a laterally injected filler wire into place within said shed and to hold the same in a predetermined spaced relationship to a preceding filler wire, said filler wire supply means comprising a spool of round wire, a pair of injection rolls positioned adjacent the end of said guide means for rolling said round wires to produce wire of an elongated cross-section and injecting the same into said guide means, and means for cutting said filler wire subsequent to its injection, said warp wire moving means being again effective subsequent to the injection of a filler wire to move said respective adjacent warp wires in the opposite direction relative to the median plane of said cloth to thus lock said filler wire into said cloth, said guide and spacing means further comprising closure means operable to release said filler wire and operable to reclose behind said filler wire preparatory to the formation and injection of an additional filler wire, said power means being effective to operate said shed forming means, said guide means and said filler wire forming and injecting means in sequence.

15. A weaving machine for weaving wire cloth composed of a plurality of definitely spaced pairs of warp wires extending lengthwise of the cloth and a plurality of definitely spaced filler wires of elongated cross-section extending transversely across the cloth with their long sides positioned at a predetermined angle to the plane thereof and locked in place by integrating twists between the wires of each of said pairs of warp wires between said filler wires, said machine including a weaving head, warp wire supply means, filler wire supply means and power means for driving said first named means, said weaving head comprising a roll of rotatable quills geared together for simultaneous rotation and each formed with diametrically disposed coaxial guides for feeding a pair of said warp wires from said warp wire supply means and effective upon rotation to twist the wires of each of said pairs together to lock a filler strip in position within said cloth and to form a shed for the reception of an additional filler strip, guide means effective to guide a laterally injected filler strip into place in said shed and to hold the same in a predetermined spaced relationship to a preceding filler wire and with its long sides at a predetermined angle to the plane of the cloth, said filler wire supply means comprising a spool of round wire, a pair of flattening and injecting rolls positioned adjacent the end of said guide means for receiving round wire from said spool flattening the same to form filler wire of elongated cross-section and injecting said filler wire into said guide means, and means for cutting said filler wire subsequent to its injection into said guide, said quills being rotatable subsequent to the injection of said filler wire to again twist each of the wires of said pairs of warp wires together to thus lock said filler wires into said cloth and to form a shed for the subsequent reception of an additional filler wire, said guide and spacing means further comprising closure means operable to release said filler wire incident to the advancement of the cloth and operable to reclose behind said filler wire preparatory to the injection of an additional filler wire, said power means being effective to operate said shed-forming means, said guide means and said filler wire injecting means in sequence.

MAX P. HEINZE.

CERTIFICATE OF CORRECTION.

Patent No. 2,214,054.   September 10, 1940.

MAX P. HEINZE.

It is hereby certified that error appears in the printed specification of the above numbered patent requiring correction as follows: Page 6, first column, line 18, for the word "arm" read --cam--; page 7, first column, line 65, for "11" read --16--; page 9, second column, line 52, claim 12, before "means" insert --and--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.